United States Patent

[11] 3,625,317

| [72] | Inventor | Max Baermann |
| | | 506 Bensberg Bezirk, Cologne, Germany |
| [21] | Appl. No. | 836,033 |
| [22] | Filed | June 24, 1969 |
| [45] | Patented | Dec. 7, 1971 |
| [32] | Priority | June 27, 1968 |
| [33] | | Germany |
| [31] | | P 17 55 827.9 |

[54] MAGNETIC BRAKE SYSTEM
5 Claims, 4 Drawing Figs.

[52] U.S. Cl. ................................................. 188/165,
310/93
[51] Int. Cl. .................................................. F16d 65/34,
H02k 49/04
[50] Field of Search ......................................... 188/164,
165; 303/3; 310/93

[56] References Cited
UNITED STATES PATENTS

| 771,193 | 9/1904 | Wells............................ | 188/165 |
| 1,246,257 | 11/1917 | Gelt............................... | 188/165 |
| 2,029,862 | 2/1936 | Dodge........................... | 188/164 |
| 2,096,433 | 10/1937 | Logan ........................... | 303/3 X |
| 3,064,149 | 11/1962 | Baermann...................... | 310/93 |
| 3,493,086 | 2/1970 | Braun............................ | 303/3 X |
| 3,506,862 | 4/1970 | Nomura et al. ................ | 188/164 X |

Primary Examiner—Duane A. Reger
Attorney—Meyer, Tilberry & Body

ABSTRACT: A magnetic brake system for vehicles, comprising an eddy current brake having a stator and a rotor. The stator is fixed with respect to the vehicle and the rotor is arranged to be driven by a member which moves relative to the vehicle. Means are provided for bringing the rotor into driven relationship with the movable member, whereby upon the energization of the eddy current brake, a braking effect is imparted to the vehicle.

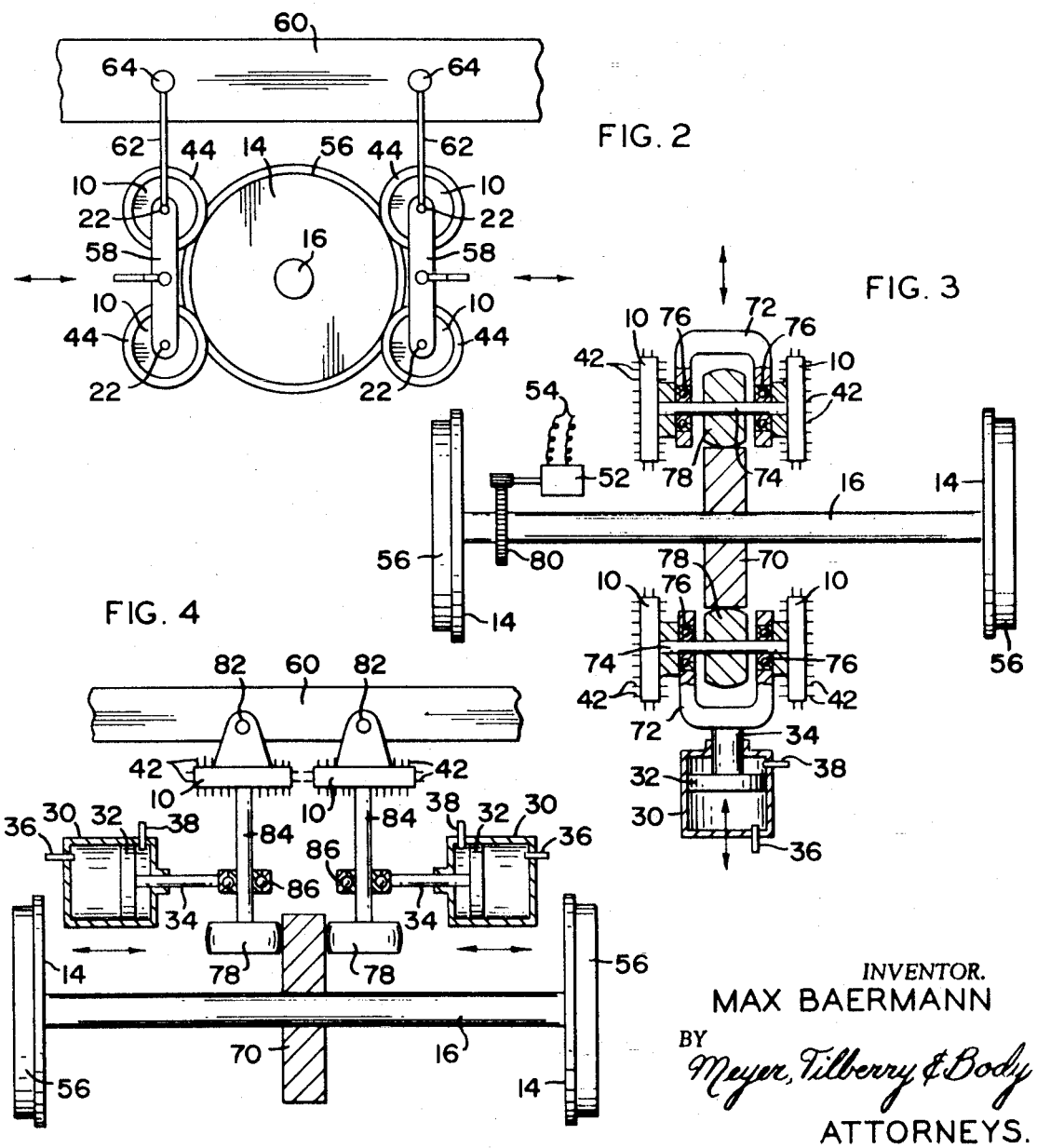

MAGNETIC BRAKE SYSTEM

The invention pertains to the brake art and more particularly to an eddy current type of brake.

The invention is particularly applicable to brake systems employed on track bound vehicles and will be described with particular reference thereto; however, it is to be appreciated that the invention has broader application and may be used on any land or airborne vehicle which presently employs conventional, friction-type braking apparatus.

It is known in the art to provide track bound vehicles with a magnetic braking system. Such systems generally include a brake member with a lining disposed thereon and a magnet having a plurality of poles arranged in a longitudinal direction to the track in spaced apart relationship. The magnet poles are comprised of magnetically permeable material which is adapted to be magnetized either by electromagnets or permanent magnets. In operations, the brake member is biased against a magnetically permeable track by magnetic attraction, thereby causing the lining to exert a pressure on the track. In this manner, a braking effect is imparted on the vehicle as a result of the friction produced between the lining and the track.

Magnetic braking systems of the foregoing type have numerous disadvantages. Firstly, they are dependent upon the creation of friction between the brake lining and the track and as a result, wear out quite rapidly, thus generating high maintenance costs. Secondly, the coefficient of friction of such brakes is quite small, although it would be desirable to have a large coefficient in order to obtain greater braking forces, particularly at high speeds. Lastly, in friction brakes the braking effect is somewhat dependent upon weather conditions. Thus, for example, if the track is wet due to a rainfall, the coefficient of friction between the brake lining and the track will be reduced, thereby lessening the overall braking effect which can be imparted to the vehicle.

The present invention contemplates a new and improved magnetic brake system for vehicles which overcomes all of the above referred problems and others, and provides a wear-resistant eddy current brake which is capable of imparting a high braking effect to the vehicle.

In accordance with the present invention there is provided a magnetic brake system for vehicles, comprising: at least one eddy current brake having a first portion and a second portion rotatable with respect to the first portion; the first portion being fixed with respect to the vehicle and the second portion being adjacent a member which moves relative to the vehicle; and means for bringing the second portion into driven relationship with the movable member, whereby upon the energization of the eddy current brake, a braking effect is imparted to the vehicle.

The principle object of the present invention is to provide an improved magnetic brake system for vehicles which is adapted to generate a high braking torque, particularly in the upper speed range.

A further object of the present invention is to provide an improved magnetic brake system for vehicles which is resistant to wear, thereby reducing upkeep and maintenance costs to a minimum.

A still further object of the present invention is to provide an improved magnetic brake system for vehicles which is not effected by weather conditions.

An additional object of the present invention is to provide an improved magnetic brake system for vehicles which is simple and economical to manufacture and install.

These and other objects and advantages will become apparent from the following description used to illustrate the preferred embodiment of the invention when read in conjunction with the accompanying drawings in which:

FIG. 1 is a side elevational view, partly in cross section, of a magnetic brake system constructed in accordance with the preferred embodiment of the present invention, wherein the rotating parts of the eddy current brake lie on the track;

FIG. 2 is a side elevational view of another embodiment of the magnetic brake system, wherein the rotating parts of the eddy current brake roll on the tread of the vehicle wheel;

FIG. 3 is a partial cross-sectional view of yet another embodiment of a magnetic brake system, wherein the eddy current brake is driven by a friction drive; and FIG. 4 is a partial cross-sectional view of a modified arrangement of the magnetic brake system of FIG. 3.

Referring now to the drawings wherein the showings are for the purpose of illustrating a preferred and modified embodiments of the invention only and not for the purpose of limiting same, FIG. 1, shows a magnetic brake system comprised of a pair of eddy current brakes 10 adjacent a track 12 upon which the vehicle, as represented by the vehicle wheels 14, travels. The eddy current brakes 10 are constructed in a manner well known in the art and comprise a stationary element and a rotating element; one of which carries an eddy current conductor and the other of which is provided with a magnet system of alternating polarity. The lines of magnetic force generated by the above described magnet system induces eddy currents in the eddy current conductor when the stationary and rotating elements move relative to one another. The magnet system can include either permanent or electro magnets.

A pair of transversely aligned wheels 14 are carried by an axle 16, the wheels and axle being referred to collectively as an axle set. A pair of axle sets are interconnected in the longitudinal direction by a bogie 18 which is secured to the vehicle frame (not illustrated). The eddy current brakes 10 are rotatably mounted on brake support members 20 by a brake axle 22. The brake support members 20 are carried on a generally U-shaped mount 24 which is movably fastened in a vertical direction to the bogie 18. In order to control the vertical movement of the mount 24, and hence the amount of pressure which will be exerted on the track 12 by the eddy current brakes 10, there is provided a double-acting compressed air cylinder 30, which is secured to the frame of the vehicle (not illustrated). The air cylinder 30 includes a piston 32 having a control rod 34 which is connected to the mount 24. An air inlet port 36 is provided for introducing compressed air into the cylinder 30 in order to force the piston 32 downward, thereby increasing the pressure between the eddy current brakes 10 and the track 12 during the braking cycle. A second air inlet port 38 is provided for introducing compressed air into the cylinder 30 in order to raise the piston 32, thereby decreasing the pressure between the eddy current brakes 10 and the track 12 during the nonbraking cycle. Although an air cylinder has been described, it is to be appreciated that a variety of devices, such as a hydraulic cylinder or worm gear arrangement, could be employed in order to lower and raise the U-shaped mount 24. Secured to the lower part of the U-shaped mount 24 are a plurality of electromagnetic attracting magnets 40, which when energized, increase the pressure exerted by the eddy current brakes 10 on the track 12.

Although commercially available eddy current brakes may take a variety of forms, in the preferred embodiment the eddy current brakes 10 are shown as a closed drum which prevents dust and dampness from effecting the operation of the brake. Such a drum type brake includes an eddy current conductor which is secured to the interior circumference of the drum and a plurality of cooling fins 42, as shown in FIGS. 3 and 4, which are disposed about the exterior surface of the drum. The drum is rotatably mounted on the brake axle 22 with the field or permanent magnets securely arranged about the circumference of the axle. In this manner the eddy current conductor rotates about and hence relative to, the field or permanent magnets.

When the brake is switched on, the rotating drum which carries the eddy current conductor is brought into driven relationship with the track 12 and rotates together with the vehicle. In so doing, eddy currents are produced in the eddy current conductor, the fields of which oppose the inducing fields of the field or permanent magnets, thereby causing a braking effect. The amount of pressure exerted on the track 12 by the rotating drum is preselected in a manner that prevents it from exceeding the pressure exerted on the track by the weight of the vehicle to be braked. Preferably these two pressures are approximately equal. In order to increase the frictional resistance between the rotating drum and the track 12, a lining 44 having a high coefficient of friction has been provided about the circumference of the tread of the drum. Conventional friction brakes 50 can be employed in conjunction with the eddy current brakes 10 in order to increase the overall braking capabilities of the vehicle and to bring it to a standstill.

In order to supply the field magnets of the eddy current brakes 10 and the electromagnetic attracting magnets 40 with current, a generator 52 is provided. The generator 52 is connected to the frame (not illustrated) of the vehicle and may be driven by a gear drive connected to the vehicle axle 16 (as illustrated in FIG. 3). The current supply from the generator 52 to the field magnets of the eddy current brakes 10 is effectuated by leads 54 which pass through a bore in the brake axle 22 and are connected to the field magnets which are arranged thereon.

Referring now to FIG. 2, which illustrates another embodiment of the magnetic brake system, wherein the eddy current brakes 10 roll on the tread segment 56 of the vehicle wheel 14. A pair of eddy current brakes 10 are provided on diametrically opposed sides of the wheel 14. Each pair of brakes is comprised of two eddy current brakes 10 which are rotatably mounted on a brake rod 58 by brake axles 22. The brake rods 58 are pivotally suspended below the frame 60 of the vehicle on a hanger bracket 62 which is secured to the frame by pins 64. When the brake is switched on, the brake rod 58 is forced inward toward the wheel 14 by means of an air cylinder arrangement, similar to that illustrated in FIG. 1, thereby causing the eddy current brake 10 to exert a pressure on the tread 56 of the wheel 14. Once having caused the rotating drum of the eddy current brake 10 to be brought into contact with the wheel 14, the operational features and effects of the brake are the same as that discussed for the embodiment illustrated in FIG. 1. When the brake is switched off, the pressure between the rotating drum of the brake 10 and the wheel 14 will be decreased.

Reference is now made to FIG. 3, which illustrates a further embodiment of the magnetic brakes system, wherein the eddy current brakes 10 are driven by a friction gear arrangement. In this embodiment a brake disc 70 is secured to the wheel axle 16 for rotation therewith. The double acting air cylinder 30, having operational features which have been described with reference to FIG. 1, is secured to the vehicle frame (not illustrated) and located in a longitudinal plane passing through the brake disc 70. Secured to the end of the control rod 34 is a generally U-shaped bracket 72 which carries a driving axle 74 in bearings 76. A driving disc 78 is secured to the driving axle 74 intermediate the legs of the U-shaped bracket 72. In this embodiment, the drum is stationary, having been secured to the U-shaped bracket 72, and hence the eddy current conductor which is disposed about the interior circumference of the drum does not rotate. Field magnets, which have been secured to the driving axle 74 rotate relative to the stationary eddy current conductor to induce the braking effect. The exterior surface of the drum has been provided with a plurality of cooling fins 42 to facilitate the dissipation of heat during the braking operation. The generator 52, which furnishes current to the field magnet, is secured to the vehicle frame and driven by means of a gear 80 which is secured to the wheel axle 16.

When compressed air is introduced through the air inlet port 36, the piston 32 is displaced inwardly toward the wheel axle 16. This inward displacement causes the driving disc 78 to exert a pressure on the brake disc 70. The rotating brake disc 70 thus drives the driving disc 78 due to the friction created therebetween, which in turn causes the field magnets of the eddy current brake to rotate relative to the eddy current conductor. In this manner the braking operation is effectuated. It is to be appreciated that the brake disc 70 and the driving disc 70 can have a variety of diameters. As such, it is possible either gear up or gear down the drive of the eddy current brakes 10 depending upon the needs of the particular application.

Referring now to FIG. 4, wherein there is illustrated a modified arrangement of the magnetic brake system of FIG. 3. The brake disc 70 is again secured to the wheel axle 16 and rotates therewith. The eddy current brakes 10 are pivotally mounted on the vehicle frame 60 by pins 82. Each of the eddy current brakes 10 includes a shaft 84 which extends axially outward therefrom and has a driving disc 78 securely fixed to the end thereof for rotation therewith. The shafts 84 are carried in a bearing assembly 86 which is secured to the end of the control rod 34 of the air cylinder 30. The foregoing arrangement of parts is such, that the driving disc 78 rolls on the opposite lateral surfaces of the brake disc 70. The construction of the eddy current brakes 10 is similar to that used in the embodiment illustrated in FIG. 3, that is, the field magnets have been secured to the shaft 84 and rotate relative to the eddy current conductor which is secured to the interior surface of the drum and hence stationary.

In the brake "on" position, compressed air is introduced into the cylinder 30 through air inlet port 36 causing the piston 32 to move in a direction toward the center line of the vehicle. This movement causes the eddy current brake 10, and hence the shaft 84 and driving disc 78, to be pivoted about pin 82, thereby increasing the pressure between the driving disc and the brake disc 70. When braking is no longer desired, compressed air is introduced into the air cylinder 30 through air inlet port 38, whereby the piston 32 moves in a direction away from the center line of the vehicle. This movement releases the pressure being exerted by the driving disc 78 on the brake disc 70.

Although the subject invention has been discussed with particular reference to track bound vehicles, it is to be appreciated that it can also be used on land vehicles as well as aircraft. Thus, for example, the rotating components of the eddy current brake could roll on the tread of a vehicle tire while the stationary components remain fixed relative to such rotation. A similar arrangement would work equally as well on the landing gear of aircraft.

Having thus described my invention, I claim:

1. A magnetic brake system for vehicles having rotatable wheels comprising at least one eddy current brake having a first portion and a second portion cooperatively rotatable with respect to said first portion, a disc rotating in cooperation with the rotation of the wheels, means associated with the vehicle carrying the first portion of the brake in fixed relation thereto, drive wheel means associated with the second portion of the brake, means to move the carrying means to bring the drive wheel into rotatably driving engagement with the disc, and means to energize the brake when said second portion thereof is rotatably driven to effect a braking effect to the vehicle through the drive wheel means and the disc.

2. A brake according to claim 1 which includes four eddy current brakes, and two drive wheel means and their respective carrying means with two brakes driven by each drive wheel means, and separate means to actuate the respective carrying means for the drive wheels, and where the drive wheels engage their periphery with the periphery of the disc so the axes of rotation of the disc and the drive wheels are parallel.

3. A brake according to claim 1 where each brake has a plurality of cooling fins associated therewith, and the periphery of the drive wheel means engages the lateral surface of the disc.

4. A magnetic brake system for vehicles comprising:
    at least one eddy current brake having a first portion and a second portion cooperating and rotatable with respect to said first portion, said first portion being nonrotatably carried by said vehicle and said second portion being adjacent a track member upon which said vehicle operates, means mounting said brake for bringing said second portion into driven relationship with said track member to effect rotation thereof upon movement of the vehicle, and means to energize said eddy current brake to impart a braking effect to said vehicle.

5. A magnetic brake system defined in claim 4 further including magnet means secured to said mounting means for causing said mounting to be attracted towards said track member when said eddy current brake is energized.

* * * * *